Jan. 28, 1964   B. L. POLKOSNIK   3,119,444
DRAPERY-SUSPENDING AND PLEAT-RETAINING DEVICES
Filed July 3, 1956   2 Sheets-Sheet 2

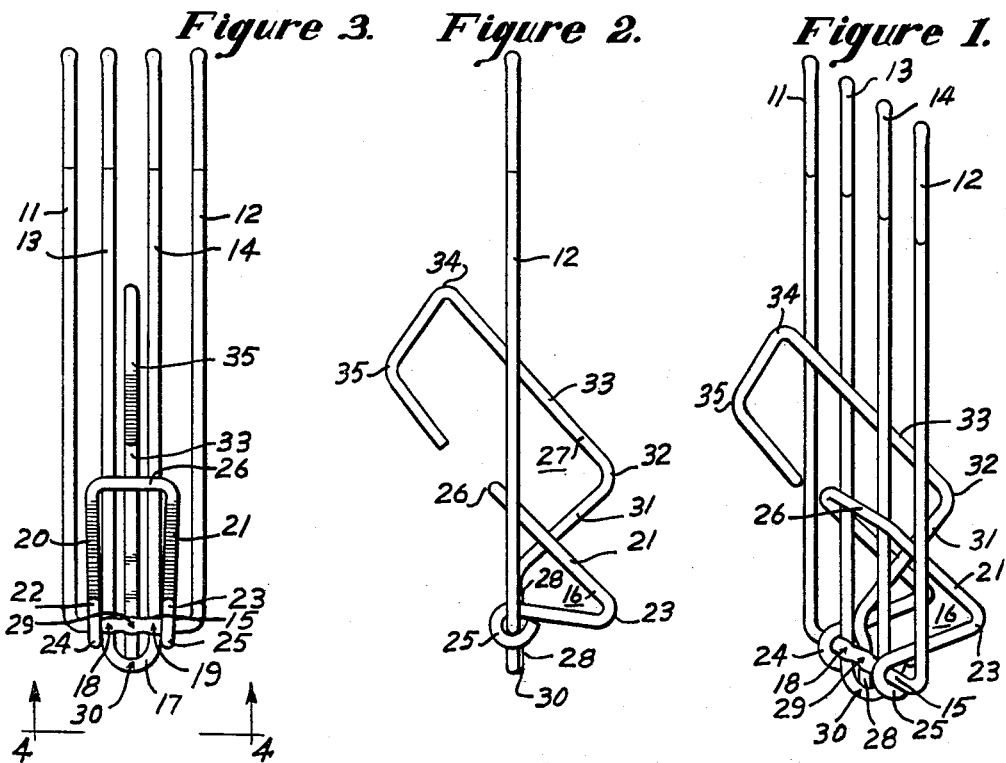
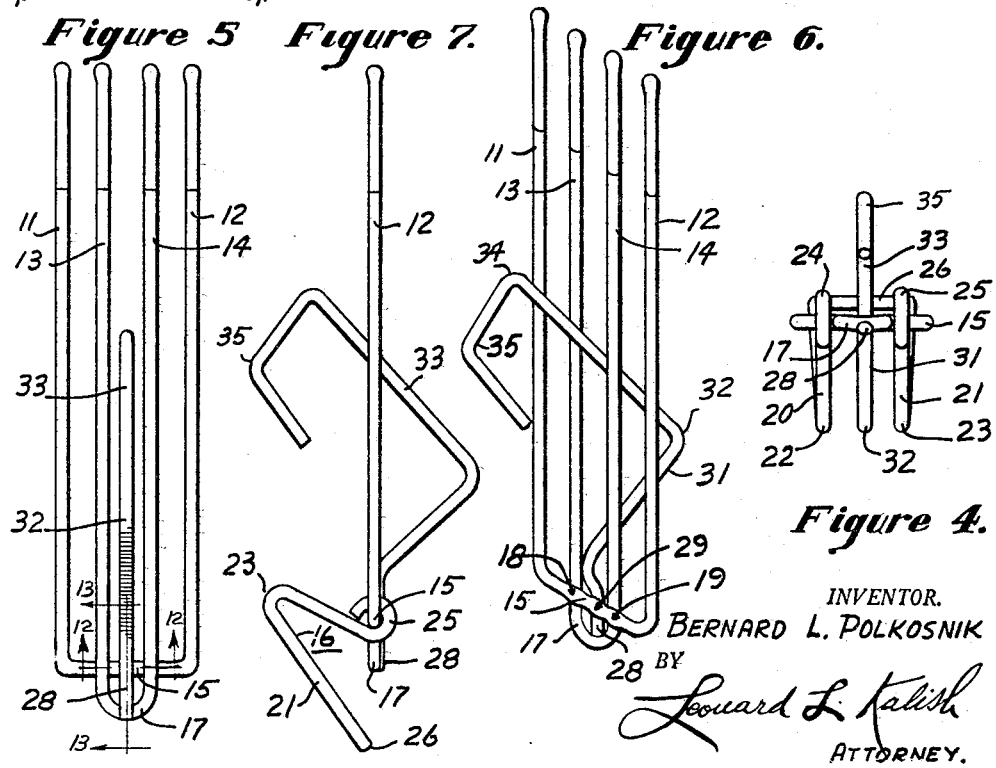

INVENTOR.
BERNARD L. POLKOSNIK
BY Leonard L. Kalish
ATTORNEY.

United States Patent Office
3,119,444
Patented Jan. 28, 1964

3,119,444
DRAPERY-SUSPENDING AND PLEAT-RETAINING DEVICES
Bernard Leonard Polkosnik, Fairfield, Conn., assignor to Conso Products, Inc., a corporation of New York
Filed July 3, 1956, Ser. No. 595,611
3 Claims. (Cl. 160—348)

The present invention relates to certain new and useful improvements in drapery-suspending and pleat-retaining devices of the type including a plurality of vertical pleat-retaining fingers and a rearwardly extending suspension hook connected with the lower ends of the fingers, which type is exemplified by the drapery-suspending and pleat-retaining devices disclosed in British Patent 24,522 to Wm. E. Knight, dated November 12, 1904; U.S. Patent 834,188 to James Carr, dated October 23, 1906; British Patent 24,665 to George Y. Ashwell, dated November 7, 1907; U.S. Patent 2,012,234 to Howard M. Steiner, dated August 27, 1935; U.S. Patents 2,623,582 and 2,623,583 to Daniel J. Handley, dated December 30, 1952; U.S. Patent 2,672,194 to Florence F. Loudon, dated March 16, 1954; U.S. Patent 2,558,467 to Bert P. Solomon, dated June 26, 1951; U.S. Patent 2,710,653 to Bert P. Solomon, dated June 14, 1955.

The present invention relates more particularly to a certain novel and improved form of construction in such a drapery-suspending and pleat-retaining device whereby the folds of the pleat will be pinched at its lower portions and will be held in place better and whereby their posture will be better maintained, and whereby also a more durable drapery-suspending and pleat-retaining device is obtained.

In the accompanying drawings in which like reference characters indicate like parts, FIGURE 1 represents a perspective view of a drapery-suspending and pleat-retaining device representing one embodiment of the present invention, with the swinging or movable pleat-pinching member thereof in its operative position.

FIGURE 2 represents a side elevational view of the same.

FIGURE 3 represents a rear elevational view of the same.

FIGURE 4 represents a bottom plan view of the same, on line 4—4 of FIGURE 3.

FIGURE 5 represents a front elevational view of the same, with the swinging or movable pleat-pinching member omitted.

FIGURE 6 represents a perspective view similar to that shown in FIGURE 1, but with the swinging or movable pleat-pinching member omitted.

FIGURE 7 represents a fragmentary side-elevational view of the device as shown in FIGURE 2, but with the swinging or movable pleat-pinching member in its inoperative position.

Figure 8:
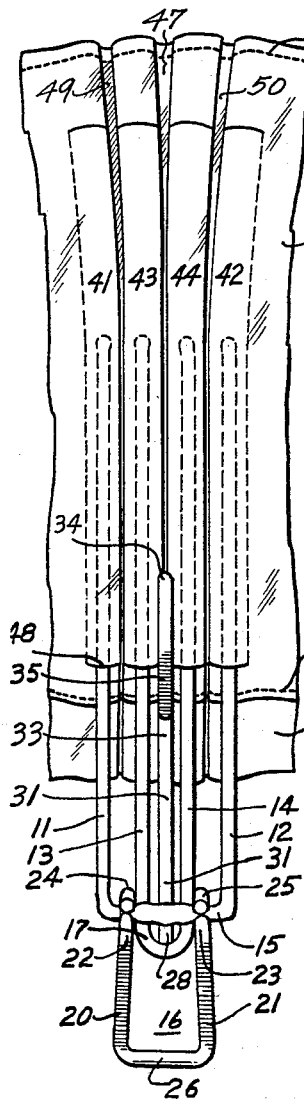
FIGURE 8 represents a rear elevational view of the drapery-suspending and pleat-retaining device, shown with its fingers partly inserted into the pockets of the drapery-pleating header-tape.

The drapery-suspending and pleat-retaining device of the present invention is formed of any suitable wire, as, for instance, a hard-drawn steel wire of relatively low carbon content, and of suitable thickness, as, for instance having a diameter of 0.080", more or less, and having appreciable resiliency and form-retaining properties, and includes a pair of outer fingers 11 and 12 and a pair of inner fingers 13 and 14. The two outer fingers are integrally connected with each other by a horizontal and generally straight connector-member or cross-bar 15, which (in the embodiment shown in FIGURES 1 to 4 and 7 to 11) also serves as a pivot or support to which the swingable or otherwise movable pleat-pinching member, designated generally by the numeral 16, may be movably secured in the manner indicated in the drawings or in any other suitable manner, whereby its pleat-pinching portion may be moved back and forth between the fingers 11 and 13 and between the fingers 12 and 14, transversely of the fingers, from a rearward inoperative position shown in FIGURES 7 and 8 to a forward operative position shown in FIGURES 1 to 4 and 9 to 11, and back again to its inoperative position shown in FIGURES 7 and 8.

Figures 12, 13:
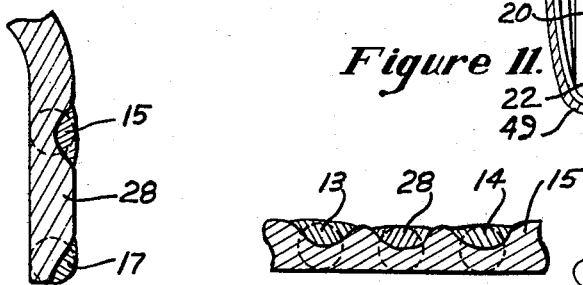
FIGURE 12 is an enlarged section on line 12—12 of FIGURE 5.
FIGURE 13 is an enlarged section on line 13—13 of FIGURE 5.

The two inner fingers 14 and 14 are connected by a lower connector or cross bar portion 17, beneath the connector 15, with the lower ends or end-portions of the fingers 13 and 14 welded to the cross-bar 15, in the areas or at points or zones 18 and 19 where said fingers 13 and 14 cross and overlap said cross-bar 15 (FIGURES 6 and 12). This results in a more durable and reliable construction in a four-finger drapery pleater and also results in the uniform bottoming of the lower edges 48 of the finger-receiving pockets 41, 42, 43 and 44, as indicated particularly in FIGURE 9. Thus, in the four-finger drapery pleater construction shown in FIGURE 1 of Solomon Patent 2,558,467 (referred to hereinabove) as well as in the four-finger drapery pleater construction shown particularly in FIGURES 4, 5, 12 and 13 of co-pending application Serial No. 412,282 filed by me (jointly with Joseph Bernhard) on February 24, 1954 (upon which application U.S. Patent 2,796,928 was issued on June 25, 1957) the lower edges of only the two inner-finger-receiving pockets are bottomed, while the lower edges of the two outer finger-receiving pockets are not bottomed because the lower edges of the two inner finger-receiving pockets become bottomed in the much higher crotch or bottom of the inner U-shaped portion formed by the lower ends of the two inner fingers and the cross-connecting portion of the wire therebetween, so that the drapery-pleating tape or header-tape (identified by the reference-numeral 25 in Patent 2,796,928) cannot settle any further down on the four fingers, and hence the entire weight of the drapery must be carried by the lower edges of only the two innermost finger-receiving pockets. This also results in a tendency to distort the pleat by the sagging of the portions thereof which are in the zone of the two outer finger-receiving pockets because their lower edges are without any support; the outer U-shaped portion (formed by the lower ends of the outer fingers and the cross-connecting portion of the wire therebetween) being too far below the crotch of the inner U in both the pleaters of Patents 2,558,467 and 2,796,928 to give any effective support to the lower edges of the two outer finger-receiving pockets.

The pleat-pinching member 16 includes two more or less parallel elbow-shaped members 20 and 21, having elbows 22 and 23. One leg of each elbow 20 and 21 has a loop, 24 and 25, respectively, embracing or looped around the cross-bar 15. The other ends of each of said elbow members 20 and 21 are interconnected by the movable cross-bar 26 forming a part of the pleat-pinching member 16.

The loops 24 and 25 embrace the cross-bar 15 between the fingers 11 and 13 and between the fingers 12 and 14, respectively, as indicated particularly in FIGURES 1, 3, 4 and 8 to 11.

A combined suspension hook and pleat-posturing member, designated generally by the numeral 27, extends transversely of the general plane of the fingers 11 to 14, between the two inner fingers 13 and 14, and includes a lower stem 28 welded to the cross-bar 15 at 29, and may also be extended down and welded to the connector 17, as at 30.

The hook and posture member 27 also includes an upwardly inclined and forwardly extending portion 31, a front elbow 32 and an upwardly and rearwardly inclined portion 33 which extends between the fingers 13 and 14, an upper bend 34, which forms the bight of the suspension-hook, and a downwardly extending portion 35, which may be merely continuously curved or formed of two straight portions bent in relation to each other as indicated in FIGURE 2, to form the downwardly extending portion of the hook adapted to be extended through the hole or eyelet of a traverse rod or of the gliders or runners on a traverse rod upon which the drapery or curtain is to be suspended.

Figure 10:
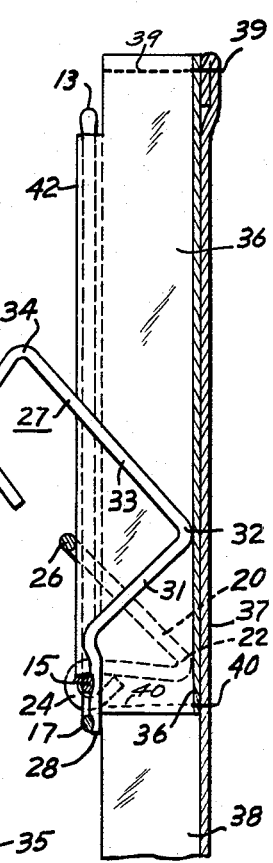
FIGURE 10 represents a section on line 10—10 of FIGURE 9.
Figure 11:
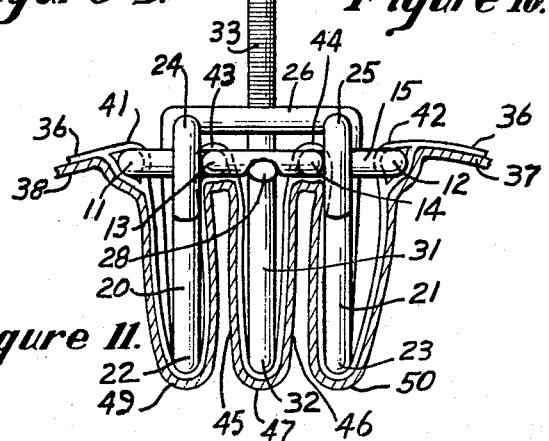
FIGURE 11 represents a section on line 11—11 of FIGURE 10.

The stationary elbow 32 preferably extends forwardly the same distance as the movable elbows 22 and 23 when the latter are in their forwardmost position, namely, in the position indicated in FIGURES 2, 10 and 11.

The stem 28 may be bent backwardly slightly, as indicated particularly in FIGURES 1 and 2, just above the cross-bar 15.

The header-tape, designated generally by the numeral 36, may be any drapery-header pleater-tape having vertical pockets at spaced intervals, as, for instance, of the tapes shown in British Patent 24,522 to Wm. E. Knight (dated November 12, 1904); U.S. Patent 834,188 to James Carr (dated October 23, 1906) and British Patent 151,108 to Thomas G. Charlton (dated December 24, 1919) but preferably having the upper ends of its pockets open (as in Knight and Carr).

Figure 9:
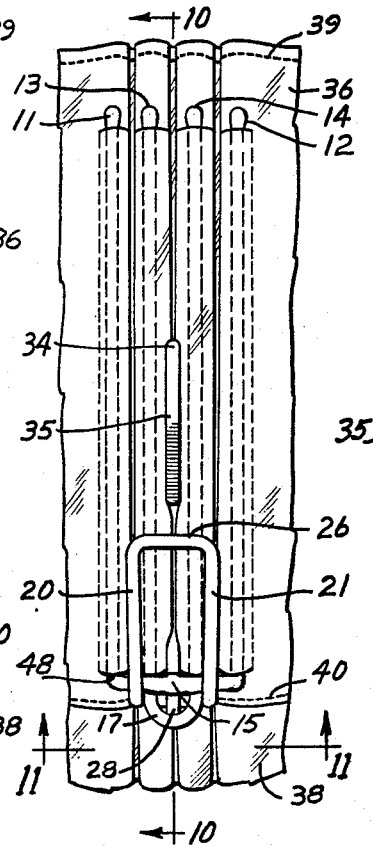
FIGURE 9 is a view similar to that shown in FIGURE 8, but with the fingers fully inserted into said pockets and with the swingable or movable pleat-pinching member moved forwardly into the two outer front-folds.

The tape 36 is sewn to the top or "head" 37 of the drapery 38 as shown in FIGURES 8 to 10, in a suitable manner, as, for instance, by the rows of sewn stitches 39 and 40. The portion of the drapery 38 below the "head" is broken away in FIGURES 8 to 10.

The four fingers 11, 12, 13 and 14 are then inserted, upwardly, into adjacent pockets 41, 42, 43 and 44, as indicated in FIGURES 8, 9 and 10, after the "head" 37 of the drapery (and the tape 36 sewn thereto) have been folded back and forth to form pleats, with the pockets 41 to 44 on the rear-folds, as indicated in FIGURES 8 to 11.

During this insertion, the swingable or movable pleat-pinching member 16 is moved to its rear or inoperative position indicated in FIGURE 7, or it may be swung all the way down (in the rear) as indicated in FIGURE 8.

While being so inserted, the central stationary elbow 32 enters between the two portions 45 and 46 of the central front-fold 47 of the pleat (having three front-folds), in the manner indicated particularly in FIGURES 8 to 11. When the fingers have been fully inserted, and the lower edges 48 of the pockets 41 to 42 abut against the cross-bar 15, as indicated, for instance, in FIGURE 9, then the movable or swingable pleat-pinching member 16 is moved forwardly into its operative position shown in FIGURES 9 to 11 (and also in FIGURES 1 to 4), so that its elbows 22 and 23 enter into the two outer front-folds 49 and 50 of the triple pleat, as shown particularly in FIGURE 11.

In some of the drawings, particularly FIGURE 11, the parts are much enlarged, and the fabric portions are out of proportion, so as to permit the showing of the several layers of fabric, namely, the drapery fabric 37 and the tape 36. The clearances between the several folds may be substantially less than that indicated in FIGURE 11, because the "head" part of the drapery is generally two layers of fabric (rather than a single layer as indicated in FIGURE 11, for simplicity in illustration), and the combined thickness of these several layers of fabrics, and of the tape and pocket-walls, permit the elbows 22 and 32 and the elbows 23 and 32 to pinch or hold the front-folds 49, 47 and 50 more closely together than indicated in FIGURE 11.

By locating the stationary elbow 32 somewhat above the elbows 22 and 23 (in their operative position), as indicated in FIGURES 1, 2, 7 and 10, the posture of the front-folds 49, 47 and 50 is maintained in a more upright position and more neatly.

In the areas or zones where the wires cross each other and are welded to each other, the wires are preferably deformed by the welding, by the simultaneous application of suitable welding-current and mechanical pressure, so that in addition to the wires being welded to each other (as, for instance, at points 18, 19, 29 and 30) the wires merge into each other in these cross-over zones or weld-zones, so that the overall thickness in these zones is substantially less than twice the diameter of the wire and so that the four pleat-retaining fingers will be in generally the same plane (as indicated, for instance, in FIGURE 7 and in FIGURES 11 and 12). Likewise, the stem 28 of the combined suspension and posturing member 27, will also be more nearly in the plane of the fingers (11 to 14) as indicated, for instance, in FIGURES 10, 11 and 13.

While in the accompanying drawings the drapery-suspending member or drapery-supporting member is shown in the form of a hook, it is to be understood that a round eyelet like or ring like terminal portion may be used in place of the open-ended hook 35. Thus, for instance, where the drapery-suspending member or curtain-suspending member (which includes the stem 38, the forwardly projecting portion 31, the elbow 32 and the rearwardly extending portion 33 and the portions 34 and 35) is to be used on a simple curtain rod (as distinguished from a traverse rod having laterally movable hangers riding therein or thereon, into which the hooks are to be hooked) the portion of the drapery or curtain suspending member which is rearwardly of the fingers (11 to 14) may be formed as a round eyelet or ring, to be laced over the curtain-rod. Hence, where the word "supporting-hook" or "suspension-hook" is used, it is intended to comprehend both an open-ended hook as well as a partly or completely closed ring.

In the use of the drapery-suspending and pleat-retaining device of the present invention, the "head" of the drapery or curtain, having spaced vertical pockets along the inner face thereof, is first folded to and fro, manually, to form a multi-fold pleat, such as a triple pleat (variously called a "pinch pleat" or a "French pleat") with the pockets disposed on the rear-folds, and the fingers of the device are then inserted into the pockets for retaining the rear-folds of such "pleat." During this insertion, the stationary pleat-posturing member 31 enters the central rear-wardly-opening front-fold. During this insertion, the movable or swingable pleat-posturing member 16 is in its retracted or inoperative position indicated in FIGURES 7 and 8. Thereafter, the movable or swingable pleat-posturing member 16 is swung forwardly into its operative position indicated in FIGURES 1 to 4 and 9 to 11, whereby the two elbow-shaped members 20 and 21 thereof enter the two outer rearwardly-opening front-folds 49 and 50 (FIGURE 11) of the "pleat."

While in the cross-section of FIGURE 11 the two elbow-shaped elements 20 and 21 of the movable or swingable pleat-pinching or pleat-posturing member 16 are shown as being more or less or generally parallel to each other, they may be angled or inclined towards each other to a greater or lesser degree, so that the elbows 22 and 23 thereof (respectively) will be spaced more closely in relation to each other than the elbows 24 and 25 thereof by which it is movably or swingably connected to the cross bar 15, so as to bring the front-folds 49 and 50 closer to each other in a zone near the bottom of the "pleat." The fabric layers constituting the "head" (including the tape 36) may be such as to fill or pack the space between the members 20 and 21 on the one hand and the intervening stationary member 31, although for clarity of illustration the fabric layer constituting the head is shown (plus the layer representing the tape 36, which is cross-sectioned in FIGURE 11). When so packed, the two elbow-shaped elements 20 and 21 of the movable or swingable pleat-posturing member 16 also have the effect of pinching together the front-folds (47, 49 and 50) of the triple pleat in the zone near the bottom of the triple pleat, while the upper portions of the front-folds of such triple pleat may flare outwardly.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having shown and described my invention, I claim the following:

1. A drapery-suspending and pleat-retaining device including four generally upright spaced-apart pleat-retaining fingers, the two outer fingers being connected at their lower ends by an upper cross-bar integral therewith, the two inner fingers being connected at their lower ends by a lower cross-bar integral therewith, the two inner fingers crossing and overlapping said upper cross-bar at cross-over points near said lower cross-bar, and being welded to said upper cross-bar in the cross-over zones, and a suspension-hook having a stem welded to one of said cross-bars.

2. A drapery-suspending and pleat-retaining device including four generally upright spaced-apart fingers adapted telescopically to engage upright finger-receiving pockets along the head of the drapery and spaced apart at distances substantially greater than the distances between the fingers, a cross-bar connecting the two outer fingers at their lower ends, a cross-connector connecting the two inner fingers at their lower ends, the lower terminal portions of the inner fingers crossing said cross-bar intermediate the two outer fingers and being welded thereto in the cross-over zones, a suspension-hook and pleat-posturing member having its lower portion connected with the lower ends of said fingers, said suspension-hook and pleat-posturing member adapted to enter the central (rearwardly-opening) front-fold of a triple pleat (whose four rear-folds are retained by said fingers) and extending rearwardly between the two inner fingers and having the bight of the hook at its upper rear end rearwardly of the median plane common to said fingers, said pleat-posturing member extending forwardly of said median plane a distance generally of the order of one-half the distance between the pockets engaged by the fingers immediately adjacent the pleat-posturing member.

3. A drapery-suspending and pleat-retaining device including at least four generally upright spaced-apart pleat-retaining fingers connected at their lower ends by connector means holding said lower ends in fixed relation to each other and preventing the lower ends of the fingers from being spread apart or contracted, said connector means including a cross-bar near the lower ends of said fingers and connecting the lower ends of at least the two outer fingers with each other, the lower terminal portions of the inner fingers crossing said cross-bar and welded thereto at the cross-over points thereof, movable pleat-shaping means movably connected with the lower ends of said fingers and adapted to being moved in relation to said fingers from an inoperative position generally rear-thereof to an operative position substantially forwardly thereof, and stationary pleat-shaping means fixedly connected with the lower ends of said fingers and having a portion thereof extending forwardly of said fingers.

References Cited in the file of this patent

UNITED STATES PATENTS

| | | |
|---|---|---|
| 2,558,467 | Solomon | June 26, 1951 |
| 2,638,978 | Atkins | May 19, 1953 |
| 2,758,645 | Sherman | Aug. 14, 1956 |
| 2,770,299 | Rosenzweig | Nov. 13, 1956 |
| 2,796,928 | Bernhard et al. | June 25, 1957 |
| 2,799,774 | Levine | July 16, 1957 |

FOREIGN PATENTS

| | | |
|---|---|---|
| 496,061 | Canada | Sept. 15, 1953 |